(12) United States Patent
Carr et al.

(10) Patent No.: US 11,299,262 B2
(45) Date of Patent: Apr. 12, 2022

(54) COMPOSITE SKID MEMBER WITH VARYING CROSS-SECTIONS

(71) Applicant: Bell Textron Inc., Fort Worth, TX (US)

(72) Inventors: Timothy Brian Carr, Fort Worth, TX (US); William Anthony Amante, Grapevine, TX (US); Brian John Cox, Keller, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 182 days.

(21) Appl. No.: 16/565,129

(22) Filed: Sep. 9, 2019

(65) Prior Publication Data
US 2021/0070428 A1 Mar. 11, 2021

(51) Int. Cl.
*B64C 25/52* (2006.01)
*B64C 25/32* (2006.01)

(52) U.S. Cl.
CPC .............. *B64C 25/52* (2013.01); *B64C 25/32* (2013.01); *B64C 2025/325* (2013.01)

(58) Field of Classification Search
CPC .... B64C 25/52; B64C 25/32; B64C 2025/325
See application file for complete search history.

(56) References Cited

U.S. PATENT DOCUMENTS

| | | | |
|---|---|---|---|
| 4,645,143 A * | 2/1987 | Coffy | B64C 25/52 244/1 OOR |
| 5,211,359 A * | 5/1993 | Rene | B64C 25/52 244/1 OOR |
| 5,366,684 A | 11/1994 | Corneau, Jr. | |
| 5,700,417 A | 12/1997 | Fernyhough et al. | |
| 7,946,530 B1 * | 5/2011 | Talmage, Jr. | B64C 37/00 244/118.2 |
| 8,597,016 B2 | 12/2013 | Brown et al. | |
| 9,731,816 B2 | 8/2017 | Harris, III et al. | |
| 9,994,308 B2 | 6/2018 | Bernier et al. | |
| 2006/0173128 A1 | 8/2006 | Connolly | |
| 2009/0014919 A1 | 1/2009 | Rossfeldt et al. | |

(Continued)

FOREIGN PATENT DOCUMENTS

WO 2013-019213 A1 2/2013

OTHER PUBLICATIONS https://en.wikipedia.org/wiki/Composite_material (Jul. 31, 2019); 1-18.

(Continued)

*Primary Examiner* — Rodney A Bonnette
(74) *Attorney, Agent, or Firm* — Pramudji Law Group PLLC; Ari Pramudji

(57) ABSTRACT

Various implementations directed to composite skid member with varying cross-sections are provided. In one implementation, an aircraft landing gear assembly may include two composite skid members configured to contact the ground, where each composite skid member includes a first cross-section and a second cross-section, and where the first cross-section is different than the second cross-section. The aircraft landing gear assembly may also include two cross members configured to couple to a fuselage of an aircraft and configured to interconnect the two composite skid members.

17 Claims, 2 Drawing Sheets

(56) References Cited

U.S. PATENT DOCUMENTS

| | | | |
|---|---|---|---|
| 2011/0210201 A1* | 9/2011 | Fews .................. | B64C 25/52 244/108 |
| 2013/0112810 A1* | 5/2013 | Amante ................ | B64C 25/52 244/108 |
| 2013/0146706 A1* | 6/2013 | Prudhomme-Lacroix ................. | B64C 25/52 244/102 R |
| 2016/0280362 A1* | 9/2016 | Prud'Homme-Lacroix ............... | B64C 25/52 |

OTHER PUBLICATIONS https://en.wikipedia.org/wiki/Carbon_fibers (Aug. 4, 2019); 1-8.
https://en.wikipedia.org/wiki/Carbon_fiber_reinforced_polymer (Aug. 11, 2019); 1-11.
https://en.wikipedia.org/wiki/Pultrusion; (Jul. 1, 2019); 1-5.
https://bedfordreinforced.com/the-pultrustion-process; (printed Aug. 15, 2019); 1-2.
https://www.strongwell.com/about/the-pultrusion-process; (printed Aug. 16, 2019); 1-3.
https://pultrex.com/pultrusion-processs; (printed Aug. 15, 2019); 1-5.
https://fiberline.com/pultrusion; (printed Aug. 15, 2019); 1.
https://www.sciencedirect.com/topics/engineering/pultrusion; (printed Aug. 15, 2019); 1-3.
Kumar, S. Naresh, et al. Design and Structural Analysis of Skid Landing Gear, Accepted (Jan. 10, 2014), Available on online (Feb. 1, 2014), Special Issue-2 (Feb. 2014): 1-8. http://inpressco.com/wp-content/uploads/2014/02/Paper121635-642.
https://en.wikipedia.org/wiki/Filament_winding; (printed on Aug. 24, 2019).
http://www.coremt.com/processes/hand-lay-up/; (printed on Aug. 24, 2019).

\* cited by examiner

COMPOSITE SKID MEMBER WITH VARYING CROSS-SECTIONS

STATEMENT REGARDING FEDERALLY SPONSORED RESEARCH OR DEVELOPMENT

Not applicable.

BACKGROUND

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

The landing gear used by aircraft may be configured to support the aircraft on the ground and allow the aircraft to taxi, takeoff, and/or land. For some aircraft, such as helicopters or other rotorcraft, the landing gear may be a skid landing gear. The skid landing gear may provide energy attenuation in various types of landings, including normal landings, hard landings, auto-rotations, and crash landings. In addition, the skid landing gear may be dynamically tuned to avoid ground resonance, such as in roll and shuffle modes.

Conventional skid landing gear may include a pair of cross members attached to a pair of skid members. Some skid members may be made from aluminum extrusions or seamless drawn aluminum tubes, where the skid members may have a constant cross-section. To attenuate energy during aircraft landings, the skid members may be designed to have a particular inertia. Specifically, a cross-section and/or thickness of the skid members may be sized such that the skid members have a particular stiffness.

In some scenarios, the sizing may be to primarily optimize the stiffness of a central portion of the skid members. However, sizing the skid members in such a manner may lead to an increase in the overall weight of the skid members and the landing gear. Further, while chemical milling may be used to reduce weight where possible, such a process may present environmental complications and may require a relatively long lead time for manufacturing.

SUMMARY

Described herein are implementations of various technologies relating to a composite skid member with varying cross-sections. In one implementation, an aircraft landing gear assembly may include two composite skid members configured to contact the ground, where each composite skid member includes a first cross-section and a second cross-section, and where the first cross-section is different than the second cross-section. The aircraft landing gear assembly may also include two cross members configured to couple to a fuselage of an aircraft and configured to interconnect the two composite skid members.

In another implementation, an aircraft landing gear assembly may include two composite skid members configured to contact the ground, where each composite skid member includes a first cross-section and a second cross-section, and where the first cross-section is different than the second cross-section. The aircraft landing gear assembly may also include two cross members configured to couple to a fuselage of an aircraft and configured to interconnect the two composite skid members, where the two cross members are composed of metallic material.

In yet another implementation, an aircraft may include a fuselage and an aircraft landing gear assembly coupled to the fuselage. The aircraft landing gear assembly may include two composite skid members configured to contact the ground, where each composite skid member includes a first cross-section and a second cross-section, and where the first cross-section is different than the second cross-section. The aircraft landing gear assembly may also include two cross members configured to couple to the fuselage and configured to interconnect the two composite skid members.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Implementations of various techniques will hereafter be described with reference to the accompanying drawings. It should be understood, however, that the accompanying drawings illustrate only the various implementations described herein and are not meant to limit the scope of various techniques described herein.

DETAILED DESCRIPTION

Various implementations directed to a composite skid member with varying cross-sections will now be described in the following paragraphs with reference to FIGS. 1-2.

As noted above, aircraft may use skid landing gear, where the skid landing gear may be configured to support the aircraft on the ground, allow the aircraft to taxi, takeoff, and/or land, provide energy attenuation in various types of landings, and may be dynamically tuned to avoid critical ground resonance modes.

Figure 1:
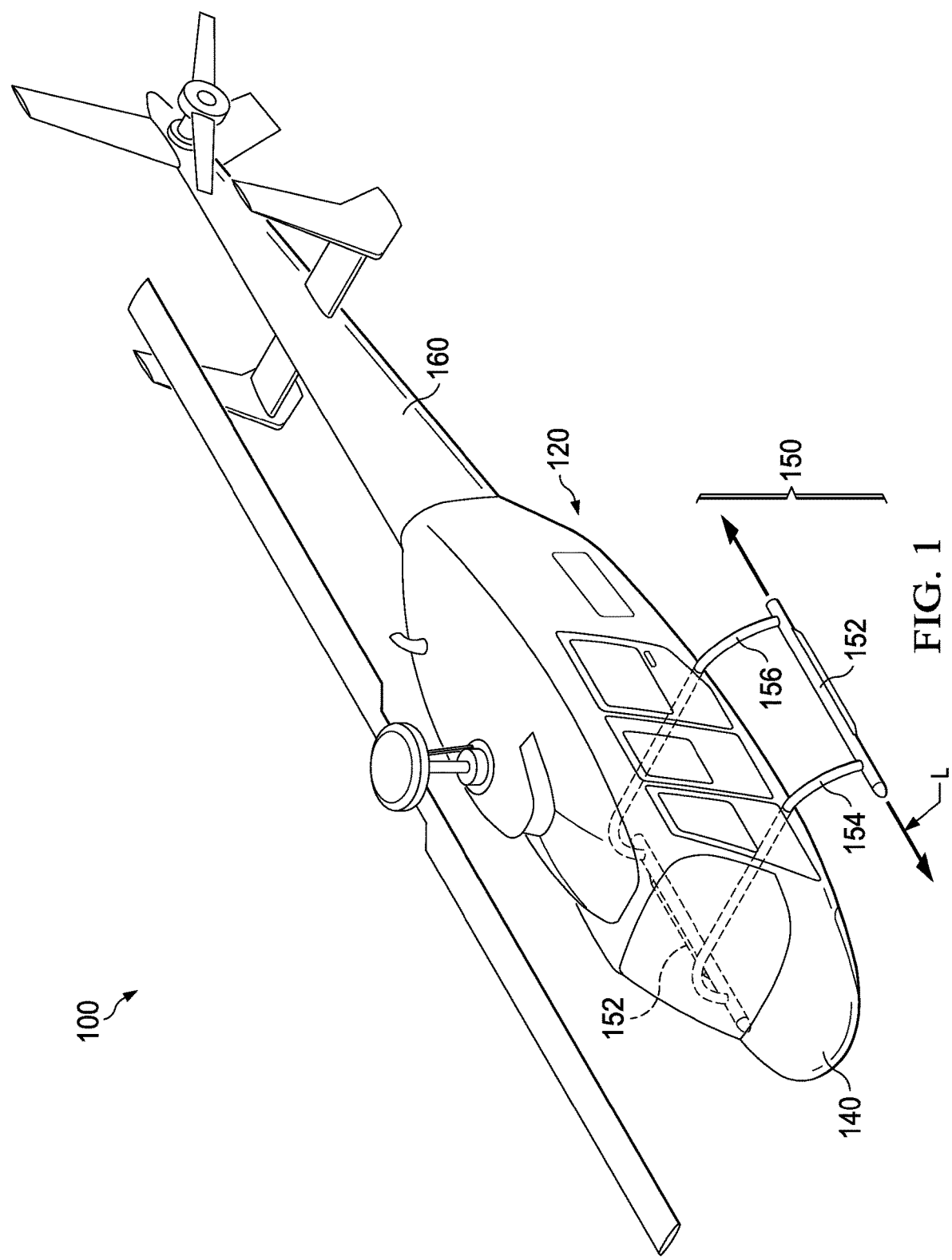
FIG. 1 illustrates a schematic diagram of an aircraft in accordance with implementations of various techniques described herein.

For example, FIG. 1 illustrates a schematic diagram of an aircraft 100 in accordance with implementations of various techniques described herein. As shown, the aircraft 100 may include a fuselage 120 having a cabin portion 140 and a tail boom 160. The aircraft 100 as depicted in FIG. 1 is a helicopter, though those skilled in the art will understand that the implementations described herein may be applied to any type of aircraft, including, but not limited to, other types of rotorcraft (e.g., gyrocopters), ultralight aircraft, vertical take-off and landing (VTOL) aircraft, sport aviation aircraft, military aircraft, general aviation aircraft, or commercial passenger aircraft. Further, the aircraft 100 may be powered by one or more engines, a propulsion system such as a rotor system, and a flight control system.

In addition, a landing gear assembly 150 may be coupled to a bottom portion of the fuselage 120. The landing gear assembly 150 may be composed of structural members, such as two longitudinal skid members 152, a front cross member 154, and a rear cross member 156.

The longitudinal skid members 152 may be configured to contact the ground. The longitudinal direction of the skid members 152 is indicated by the longitudinal axis L shown in FIG. 1, where the axis L is horizontal and parallel to a horizontal ground surface when the aircraft 100 rests on the ground surface. The front and rear cross members 154, 156 may be coupled to the fuselage 120 using any fittings (not shown) known to those skilled in the art, where the fittings may be external or internal to the fuselage 120. The cross members 154, 156 may be used to interconnect the two skid members 152. In particular, the longitudinal skid members 152 and the cross members 154, 156 may together be configured to provide energy attenuation for various landings of the aircraft 100, such as through elastic and plastic deformation of the skid members 152 and/or the cross members 154, 156.

In some scenarios, the skid members 152 may be susceptible to damage during aircraft landings, particularly for landings on unimproved surfaces or debris. Accordingly, to avoid such damage and to attenuate energy during aircraft landings, the skid members 152 may be designed to have a particular inertia. Specifically, the cross-section and/or thickness of the skid members 152 may be sized such that the skid members 152 have a particular stiffness. In some scenarios, skid members with larger sizing may have increased stiffness and, thus, increased inertia. However, an increased size may also lead to an increase in weight for the skid members 152, particularly if the skid members 152 have a constant cross-section such that its size is uniformly increased along its length (i.e., along the longitudinal axis L).

As such, various implementations described herein may include the use of composite skid members, where each composite skid member may include cross-sections that vary along its length. Composite skid members may refer to skid members manufactured using composite material. Further, each composite skid member may include a central portion having a larger cross-section than other portions of the skid member. By using composite material and cross-sections of different sizes, the composite skid members described herein may have a lower weight than the skid members mentioned above. In addition, by using skid members composed of composite material, chemical milling and its associated issues (e.g., environmental complications, increased manufacturing time, and the like) may also be avoided.

Figure 2:
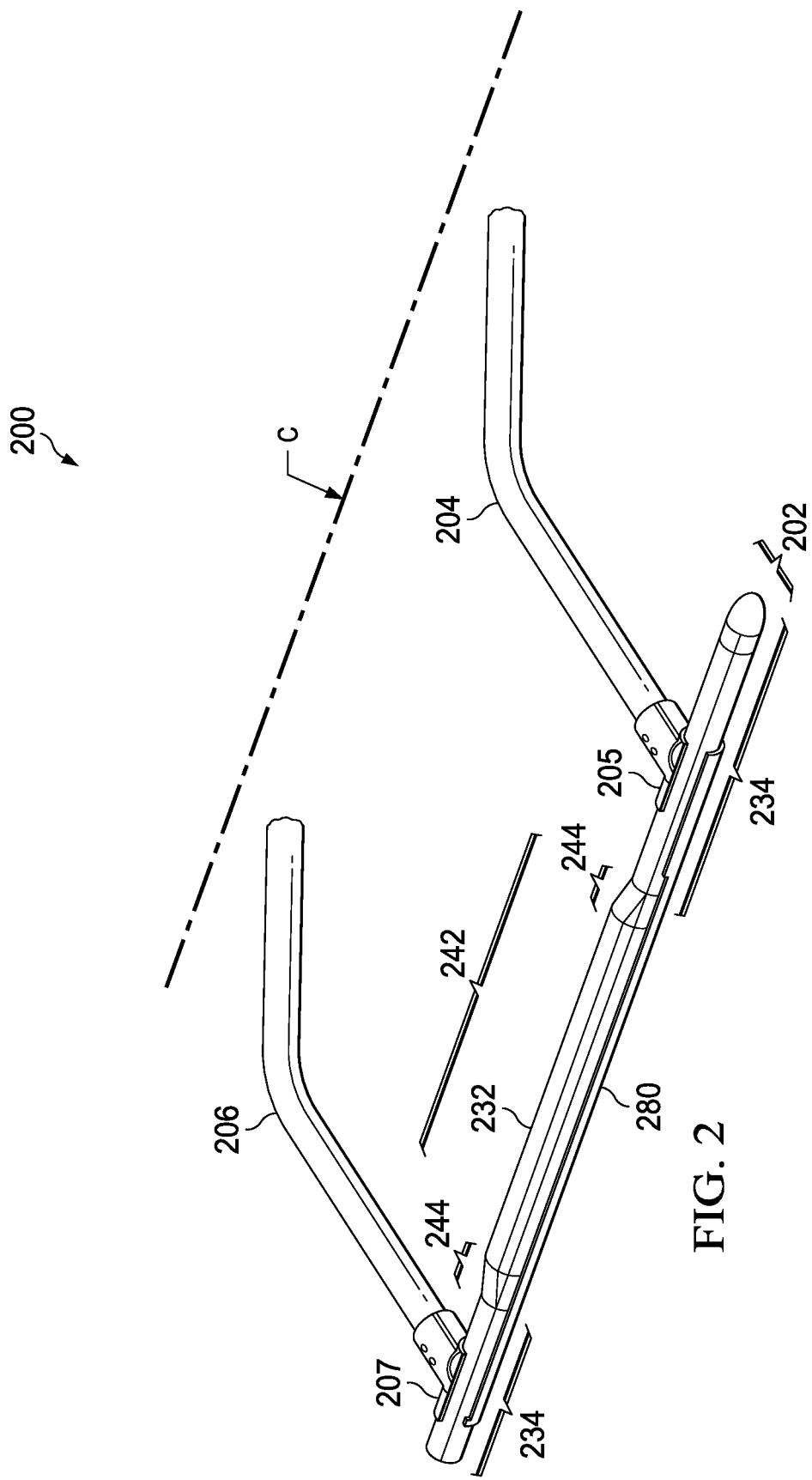
FIG. 2 illustrates a partial schematic diagram of a landing gear assembly in accordance with implementations of various techniques described herein.

FIG. 2 illustrates a partial schematic diagram of a landing gear assembly 200 in accordance with implementations of various techniques described herein. In particular, FIG. 2 illustrates one half of the landing gear assembly 200, where the landing gear assembly 200 includes two composite skid members 202, a front cross member 204, and a rear cross member 206. The landing gear assembly 200 may be used with any aircraft (not shown) known in the art, such as the aircraft 100 discussed above.

However, only one composite skid member 202, a portion of a front cross member 204, and a portion of a rear cross member 206 are displayed. Those skilled in the art will understand that the other half of the landing gear assembly 200 is a mirror image of the assembly 200 shown in FIG. 2, such that another composite skid member 202 is included and each cross member 204, 206 is symmetrical about a central line C of a fuselage (e.g., fuselage 120) of the aircraft. Though not shown in FIG. 2, those skilled in the art will understand that the front cross member 204 and the rear cross member 206 may each be in the shape of arches. In one implementation, the composite skid members 202 and the cross members 204, 206 may together be configured to provide energy attenuation for various landings of the aircraft, such as through elastic and plastic deformation of the composite skid members 202 and/or the cross members 204, 206.

As similarly discussed above for FIG. 1, the front and rear cross members 204, 206 may be coupled to the fuselage (not shown) of the aircraft using any fittings known to those skilled in the art, where the fittings may be external or internal to the fuselage. The cross members 204, 206 may be used to interconnect the two composite skid members 202 to each other. In one implementation, the cross members 204, 206 may be coupled to each of the composite skid members 202 using any implementations known to those skilled in the art, including, but not limited to, screws, bolts, rivets, sleeves, saddles, and the like.

The cross-sections of cross members 204, 206 may be circular, rectangular, and/or any other shape known to those skilled in the art. In another implementation, the cross members 204, 206 may be made of metallic material. As such, the landing gear assembly 200 may include metallic cross members 204, 206 coupled to composite skid members 202. For example, the cross members 204, 206 may be made of an aluminum alloy (e.g., 7075-T73511 or 7075-T6511).

The composite skid members 202 may be configured to contact the ground. In particular, the composite skid members 202 may be horizontal and parallel to a horizontal ground surface when the aircraft (not shown) using the landing gear assembly 200 rests on the ground surface.

As noted above, composite skid members may refer to skid members manufactured using composite material. Composite material may refer to material formed by combining two or more constituent materials with different physical or chemical properties that, when combined, produce a material with characteristics different from the individual components. Composite material may include reinforced polymers, such as fiberglass or fiber-reinforced polymers. One example of fiber-reinforced polymers may include carbon fiber reinforced polymers.

Composite material, such as carbon fiber reinforced polymers, may be relatively high in strength and low in weight, particularly when compared to metallic material such as aluminum alloys. Accordingly, skid members 202 composed of composite material, such as carbon fiber reinforced polymers, may be relatively high strength and lightweight when compared to conventional skid members. In one example, the landing gear assembly 200 may include cross members 204, 206 made of an aluminum alloy (e.g., 7075-T73511 or 7075-T6511) coupled to composite skid members 202 made of a carbon fiber reinforced polymer.

In one implementation, each composite skid member 202 may include a central portion 232 disposed between two end portions 234. In particular, the central portion 232 may correspond to a segment of the skid member 202 that includes a midpoint of the skid member 202. Each end portion 234 may correspond to a segment of the skid member 202 that includes an end of the skid member 202. In another implementation, the cross members 204, 206 may couple to each composite skid member 202 at coupling locations 205, 207 on the skid member 202, where the coupling locations 205, 207 are positioned within the end portions 234. In a further implementation, the central portion 232 may be positioned between the coupling locations 205, 207 on the composite skid member 202.

As mentioned above, each composite skid member 202 may include cross-sections that vary along the length of the member 202. As shown in FIG. 2, the central portion 232 may have different cross-sectional dimensions than those of the end portions 234. In one implementation, a dimensional measurement of at least one cross-section of the central portion 232 may be larger than a similar dimensional measurement of a cross-section of each end portion 234, as further explained below. The central portion 232 may have one or more cross-sections that are circular, rectangular, and/or any other shape known to those skilled in the art. Similarly, the end portions 234 may have one or more cross-sections that are circular, rectangular, and/or any other shape known to those skilled in the art. The central portion 232 and/or the end portions 234 may be straight or substantially straight, though other configurations may also be used.

In one implementation, the central portion 232 may have a constant cross-section along a majority of its length. For example, as shown in FIG. 2, a main section 242 of the central portion 232 may have a constant, circular cross-section throughout the length of the section 242. The end portions 234 may each also have a constant cross-section along at least a majority of its length. For example, as shown in FIG. 2, each end portion 234 may have the same constant, circular cross-section throughout the length of each end portion 234. As can be inferred from FIG. 2, a diameter of the circular cross-section of the main section 242 may be larger than a diameter of the circular cross-section of each end portion 234. As such, in FIG. 2, a dimensional measurement (e.g., a measurement of diameter) of at least one cross-section of the central portion 232 may be larger than a similar dimensional measurement (e.g., a measurement of diameter) of a cross-section of each end portion 234.

In some implementations, the central portion 232 may be connected directly with the end portions 234. In such implementations, such as in FIG. 2, the central portion 232 may include transitional sections 244 that connect with the end portions 234, where the main section 242 may be disposed between the transitional sections 244. In particular, the transitional sections 244 may have cross-sections that progressively vary to merge with the cross-sections of the end portions 234. For example, as shown in FIG. 2, the cross-sectional diameter of each transitional section 244 may progressively decrease until it matches the cross-sectional diameter of a proximate end portion 234.

As mentioned above, the central portion 232 and the end portions 234 may have one or more cross-sections that are of any shape known in the art, and are not be limited to the circular cross-sections shown in FIG. 2. In one implementation, the central portion 232 and the end portions 234 may each have rectangular cross-sections. In such an implementation, a length and/or width of the rectangular cross-section of the main section 242 may be larger than a length and/or width of the rectangular cross-section of each end portion 234. As such, a dimensional measurement (e.g., a measurement of length and/or width) of at least one cross-section of the central portion 232 may be larger than a similar dimensional measurement (e.g., a measurement of length and/or width) of a cross-section of each end portion 234. In a further implementation, the cross-sectional length and/or width of each transitional section 244 may progressively decrease until it matches the cross-sectional length and/or width of a proximate end portion 234.

The end portions 234 may have the same or different lengths, cross-sectional shapes, and/or cross-sectional dimensions as one another, where the central portion 232 may still have larger cross-sectional dimensions than either end portion 234. In another implementation, the central portion 232 may have a different cross-sectional shape than one or more of the end portions 234.

In yet another implementation, and as shown in FIG. 2, the central portion 232 and the end portions 234 may be aligned such that a bottom of the composite skid member 202 is configured to be level with a horizontal ground surface. In a further implementation, each composite skid member 202 may also have a scuff guard 280 coupled thereto, where the scuff guard 280 may be used to minimize wear on the bottom of the composite skid member 202 by protecting the member 202 during landings and while the aircraft (not pictured) is positioned on the ground. Each scuff guard 280 may be in the form of a shoe that is configured to surround at least the bottom of the composite skid member 202. Each scuff guard 280 may be coupled to the composite skid member 202 using any implementations known to those skilled in the art, including, but not limited to, screws, bolts, rivets, and the like. In one implementation, the scuff guards 280 may be composed of steel.

As such, the implementations above describe a composite skid member 202 having cross-sections that vary along the length of the member 202. In particular, the central portion 232 of the composite skid member 202 may have a larger cross-section than each end portion 234 of the member 202. Accordingly, the central portion 232, which may correspond to the part of the skid member 202 most susceptible to damage during aircraft landings, may have a sufficient inertia to avoid such damage and to attenuate energy during these landings. The end portions 234 may have relatively smaller cross-sections, and thus may help to reduce the weight of the skid member 202. Moreover, by using composite material, the manufacturing process for the composite skid member 202 may avoid chemical milling and its associated issues.

Any implementation known in the art may be used to manufacture the composite skid members 202. In one implementation, a filament winding process may be used to manufacture the composite skid members 202. In such an implementation, fibers (e.g., carbon fibers) may be wound over a rotating mandrel in a desired pattern or angle, where the mandrel may rotate using a spindle. The fibers may be impregnated with a resin while being wound on the mandrel. Once the mandrel has been covered with the fibers, with sections of the mandrel being covered with the appropriate shape and/or thickness of the fibers, the mandrel may be placed in a curing mechanism to polymerize and set the resin. The curing mechanism may include ovens, mechanisms using radiant heaters, and/or the like. Once the resin has been cured, the mandrel is removed or extracted, leaving a product of composite material (e.g., carbon fiber reinforced polymer). The product may be in the form of the composite skid member 202, or may need further refinement (cutting, etc.) to be in the form of the composite skid member 202. In some implementations, the filament winding process may be automated.

In another implementation, a hand lay-up process may be used to manually wound the fibers over the mandrel. After being placed over the mandrel, the fibers may then be impregnated with a resin. After the fibers have been impregnated, with sections of the mandrel being covered with the appropriate shape and/or thickness of the fibers, the mandrel may be placed in a curing mechanism, as similarly described above, to polymerize and set the resin. Once the resin has been cured, the mandrel is removed or extracted, leaving a product of composite material (e.g., carbon fiber reinforced polymer). The product may be in the form of the composite skid member 202, or may need further refinement (cutting, etc.) to be in the form of the composite skid member 202.

For the implementations described above, the mandrel may have the same varying cross-sections as the composite skid members 202 described herein. As such, the mandrel may not easily be removed from the product of composite material. In one implementation, the mandrel may be composed of multiple pieces that are configured to be deconstructed in order for the mandrel to be removed or extracted from the product of composite material. In another implementation, the mandrel may be made of eutectic salts. In such an implementation, the mandrel may be removed from the product of composite material by solubilizing the mandrel in water, such as by spraying or jetting water into the product. In yet another implementation, the mandrel may an inflatable bladder, which can be deflated in order to remove or extract the mandrel from the product of composite material. Other implementations known in the art for removing the mandrel from the product of composite material may be used, as well.

In sum, the implementations disclosed herein may be used to utilize landing gear having composite skid members with varying cross-sections. The central portion of such skid members may have a larger cross-section than the end portions of the composite skid member, thereby allowing the composite skid member to have sufficient inertia to avoid damage during landings while having a lower weight when compared to conventional skid members. Moreover, by using composite material, the manufacturing process for the composite skid members may avoid chemical milling and its associated issues.

The discussion above is directed to certain specific implementations. It is to be understood that the discussion above is only for the purpose of enabling a person with ordinary skill in the art to make and use any subject matter defined now or later by the patent "claims" found in any issued patent herein.

It is specifically intended that the claimed invention not be limited to the implementations and illustrations contained herein, but include modified forms of those implementations including portions of the implementations and combinations of elements of different implementations as come within the scope of the following claims. It should be appreciated that in the development of any such actual implementation, as in any engineering or design project, numerous implementation-specific decisions may be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the claimed invention unless explicitly indicated as being "critical" or "essential."

In the above detailed description, numerous specific details were set forth in order to provide a thorough understanding of the present disclosure. However, it will be apparent to one of ordinary skill in the art that the present disclosure may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the present disclosure herein is for the purpose of describing particular implementations only and is not intended to be limiting of the present disclosure. As used in the description of the present disclosure and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. As used herein, the terms "up" and "down"; "upper" and "lower"; "upwardly" and downwardly"; "below" and "above"; and other similar terms indicating relative positions above or below a given point or element may be used in connection with some implementations of various technologies described herein.

While the foregoing is directed to implementations of various technologies described herein, other and further implementations may be devised without departing from the basic scope thereof. Although the subject matter has been described in language specific to structural features and/or methodological acts, it is to be understood that the subject matter defined in the appended claims is not limited to the specific features or acts described above. Rather, the specific features and acts described above are disclosed as example forms of implementing the claims.

What is claimed is:

1. An aircraft landing gear assembly, comprising:
   two composite skid members configured to contact the ground, wherein each composite skid member comprises a first cross-section at a central portion of each composite skid member and a second cross-section at at least one end portion of each composite skid member, and wherein the first cross-section is different than the second cross-section; and
   two cross members configured to couple to a fuselage of an aircraft and configured to interconnect the two composite skid members;
   wherein the central portion comprises the first cross-section, wherein the first cross-section has a first dimensional measurement; and the respective end portion comprises the second cross-section, wherein the second cross-section has a second dimensional measurement, and wherein the first dimensional measurement is greater than the second dimensional measurement, and
wherein the central portion and at least one end portion are linear.

2. The aircraft landing gear assembly of claim 1, wherein the two cross members comprise a front cross member and a rear cross member.

3. The aircraft landing gear assembly of claim 1, wherein the two composite skid members comprise two skid members made of composite material.

4. The aircraft landing gear assembly of claim 3, wherein the composite material comprises carbon fiber reinforced polymer.

5. The aircraft landing gear assembly of claim 1, wherein a respective composite skid member comprises: the central portion corresponding to a midpoint of the respective composite skid member; and two end portions, wherein a respective end portion corresponds to an end of the respective composite skid member.

6. The aircraft landing gear assembly of claim 5, wherein the central portion is disposed between the two end portions.

7. The aircraft landing gear assembly of claim 1, wherein: the first cross-section and the second cross-section are circular; the first dimensional measurement corresponds to a first diameter measurement of the first cross-section of the central portion; and the second dimensional measurement corresponds to a second diameter measurement of the second cross-section of the respective end portion, wherein the first diameter measurement is greater than the second diameter measurement.

8. The aircraft landing gear assembly of claim 1, wherein: the first cross-section and the second cross-section are rectangular; the first dimensional measurement corresponds to a first length measurement of the first cross-section of the central portion; and the second dimensional measurement corresponds to a second length measurement of the second cross-section of the respective end portion, wherein the first length measurement is greater than the second length measurement.

9. The aircraft landing gear assembly of claim 1, wherein: the first cross-section and the second cross-section are rectangular; the first dimensional measurement corresponds to a first width measurement of the first cross-section of the central portion; and the second dimensional measurement corresponds to a second width measurement of the second cross-section of the respective end portion, wherein the first width measurement is greater than the second width measurement.

10. The aircraft landing gear assembly of claim 1, wherein the central portion has a higher inertia than the respective end portion.

11. The aircraft landing gear assembly of claim 1, wherein the central portion comprises two transitional sections, wherein each transitional section has cross-sections that progressively decrease in size from the first cross-section to the second cross-section.

12. The aircraft landing gear assembly of claim 1, further comprising
a scuff guard coupled to each composite skid member, wherein the scuff guard is configured to surround at least a bottom portion of each composite skid member.

13. The aircraft landing gear assembly of claim 1, wherein the two composite skid members comprise composite skid members manufactured using a filament winding process, a hand lay-up process, a mandrel of multiple pieces, a eutectic salt mandrel, an inflatable bladder, or combinations thereof.

14. The aircraft landing gear assembly of claim 1, wherein the aircraft is a helicopter.

15. An aircraft landing gear assembly, comprising:
two composite skid members configured to contact the ground, wherein each composite skid member comprises a first cross-section and a second cross-section, and wherein the first cross-section is different than the second cross-section; and
two cross members configured to couple to a fuselage of an aircraft and configured to interconnect the two composite skid members, wherein the two cross members are composed of metallic material;
wherein a respective composite skid member comprises: a central portion that corresponds to a midpoint of the respective composite skid member, wherein the central portion comprises the first cross-section, and wherein the first cross-section has a first dimensional measurement; and two end portions, wherein a respective end portion corresponds to an end of the respective composite skid member, wherein the respective end portion comprises the second cross-section, wherein the second cross-section has a second dimensional measurement, and wherein the first dimensional measurement is greater than the second dimensional measurement,
wherein the central portion and at least one end portion are linear.

16. The aircraft landing gear assembly of claim 15, wherein: the metallic material comprises an aluminum alloy; and the two composite skid members comprise two skid members made of carbon fiber reinforced polymer.

17. An aircraft, comprising:
a fuselage;
an aircraft landing gear assembly, comprising:
two composite skid members configured to contact the ground, wherein each composite skid member comprises a first cross-section and a second cross-section, and wherein the first cross-section is different than the second cross-section; and
two cross members configured to couple to the fuselage and configured to interconnect the two composite skid members;
wherein a respective composite skid member comprises: a central portion that corresponds to a midpoint of the respective composite skid member, wherein the central portion comprises the first cross-section, and wherein the first cross-section has a first dimensional measurement; and two end portions, wherein a respective end portion corresponds to an end of the respective composite skid member, wherein the respective end portion comprises the second cross-section, wherein the second cross-section has a second dimensional measurement, and wherein the first dimensional measurement is greater than the second dimensional measurement,
wherein the central portion and the two end portions are linear.

* * * * *